Sept. 11, 1956     L. BERTELE     2,762,262
TELEPHOTO OBJECTIVE COMPRISING FOUR LENSES
AND FORMING THREE COMPONENTS
Filed Dec. 27, 1954
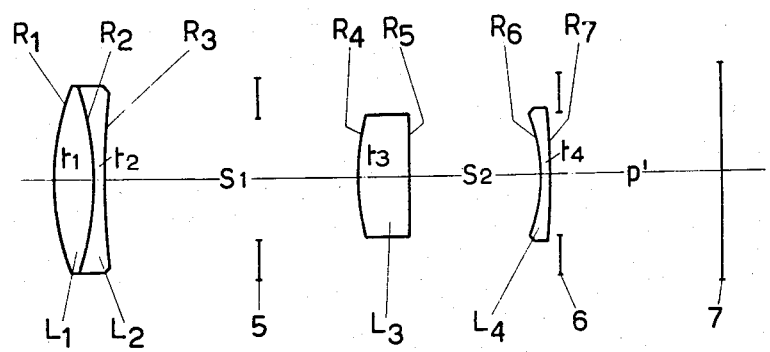

2,762,262

TELEPHOTO OBJECTIVE COMPRISING FOUR LENSES AND FORMING THREE COMPONENTS

Ludwig Bertele, Heerbrugg, Switzerland

Application December 27, 1954, Serial No. 477,672

3 Claims. (Cl. 88—57)

The present invention relates to a telephoto objective with a relative aperture of about 1:4 and an angle of view of about 12°, with a path of rays transversing in such a manner that, through a segment-shutter in the camera case directly behind the objective with an internal diameter of about two thirds or smaller of the diameter of the largest image circle, the vignetting of the light in the edges of the image is still admissible also with the shortest time of exposure. A possibility in providing this object is to construct the objective in such a way that the front principal point is located as far as possible in front of the objective. An objective adapted to this purpose substantially consists of three air-spaced components, the positive element towards the object being composed of a biconvex and a biconcave lens, the second likewise is a converging component forming a simple lens with its stronger curved surface towards the object, the third negative component being bent towards the image and furthermore the following algebraic conditions will be met:

(a)  $\quad 3.0 \; s_2 > s_1 > s_2$
(b)  $\quad 0.36 \; F > p' > 0.18 \; F$
(c)  $\quad F < f_{1+2} < 2 \; F$
(d)  $\quad 1.15 \; F > (t_1 + t_2 + s_1 + t_3 + s_2 + t_4 + p') > 0.85 \; F$ where $s_1$ and $s_2$ are the air spaces between the components,
$t_1$—$t_2$ and $t_3$ the thicknesses of the lenses,
$f_{1+2}$ the focal length of the first component,
$p'$ the distance between the rear surface ($R_7$) of the objective and the image,
$F$ the focal length of the objective.

The single figure of the drawing shows a telephoto objective embodying the present invention and in connection with this figure there are herewith given two examples of an objective embodying the present invention. The diaphragm is denoted by symbol 5, the shutter by symbol 6 and the image by symbol 7. The radii of curvature R, the thicknesses of lenses $t$ and the axial air distances $s$ are consecutively numbered from the side of the major conjugate to the side of the minor conjugate. The glasses of the lenses forming the objective are characterized by their mean refraction numbers $n_d$ in connection with their colour dispersion by the Abbe numbers $\nu$.

Example 1

[Relative aperture 1:4   focal length 100 mm.   $p'$ 25.3 mm.]

| | | | | |
|---|---|---|---|---|
| $L_1$ | $R_1 = +36.50$ | $t_1 = 5.56$ | $n_d = 1.5103$ | $\nu = 63.4$ |
| | $R_2 = -46.56$ | | | |
| $L_2$ | | $t_2 = 1.48$ | $n_d = 1.6256$ | $\nu = 39.1$ |
| | $R_3 = +159.0$ | | | |
| | | $s_1 = 37.04$ | | |
| | $R_4 = +41.67$ | | | |
| $L_3$ | | $t_3 = 7.41$ | $n_d = 1.5109$ | $\nu = 60.6$ |
| | $R_5 = \infty$ | | | |
| | | $s_2 = 19.26$ | | |
| | $R_6 = -24.11$ | | | |
| $L_4$ | | $t_4 = 1.48$ | $n_d = 1.6411$ | $\nu = 58.0$ |
| | $R_7 = -146.27$ | | | |

According to the above example, (a)  $\quad 3.0 \times 19.26 > 37.04 > 19.26$
(b)  $\quad 0.36 \times 100 > 25.3 > 0.18 \times 100$
(c)  $\quad 100 < 126 < 200$
(d)  $\quad 1.15 \times 100 > 5.56 + 1.48 + 37.04 + 7.41 + 19.26 + 1.48 + 25.3 = 97.53 > 0.85 \times 100$ The front principal point is located 71 mm. in front of the objective.

Example 2

[Relative aperture 1:4   focal length 100 mm.   $p'$ 25.2 mm.]

| | | | | |
|---|---|---|---|---|
| $L_1$ | $R_1 = +35.18$ | $t_1 = 4.69$ | $n_d = 1.5111$ | $\nu = 63.4$ |
| | $R_2 = -48.96$ | | | |
| $L_2$ | | $t_2 = 1.56$ | $n_d = 1.6261$ | $\nu = 39.1$ |
| | $R_3 = +136.0$ | | | |
| | | $s_1 = 37.74$ | | |
| | $R_4 = +35.55$ | | | |
| $L_3$ | | $t_3 = 2.96$ | $n_d = 1.5400$ | $\nu = 59.6$ |
| | $R_5 = +170.84$ | | | |
| | | $s_2 = 22.14$ | | |
| | $R_6 = -22.22$ | | | |
| $L_4$ | | $t_4 = 1.48$ | $n_d = 1.6200$ | $\nu = 60.2$ |
| | $R_7 = -106.83$ | | | |

According to the above example, (a)  $\quad 3.0 \times 22.14 > 37.74 > 22.14$
(b)  $\quad 0.36 \times 100 > 25.2 > 0.18 \times 100$
(c)  $\quad 100 < 125.9 < 200$
(d)  $\quad 1.15 \times 100 > 4.69 + 1.56 + 37.74 + 2.96 + 22.14 + 1.48 + 25.2 = 95.77 > 0.85 \times 100$ The front principal point is located 71.5 mm. in front of the objective.

What I claim and desire to secure by Letters Patent of the United States is:

1. A telephoto objective fully corrected for the different errors of image, said objective comprising four lenses divided into three components, the front component being positive and being composed of a biconvex converging lens and a biconcave diverging lens, the middle component being a simple converging lens with its stronger curved surface towards the object, the third component being a simple negative lens and bent towards the image, in which $s_1$ and $s_2$ are the air spaces between the components,
$t_1$—$t_4$ the thicknesses of the lenses,
$f_{1+2}$ the focal length of the first component,
$p'$ the distance between the rear surface ($R_7$) of the objective and the image,
$F$ the focal length of the objective, and which are within the limits specified in the following algebraic relationships:

(a)  $\quad 3.0 \; s_2 > s_1 > s_2$
(b)  $\quad 0.36 \; F > p' > 0.18 \; F$
(c)  $\quad F < f_{1+2} < 2 \; F$
(d)  $\quad 1.15 > t_1 + t_2 + s_1 + t_3 + s_2 + t_4 + p' > 0.85 \; F$ 2. A fully corrected 100 mm. focal length telephoto objective having substantially the following characteristics:

| | | | | |
|---|---|---|---|---|
| $L_1$ | $R_1 = +36.50$ | $t_1 = 5.56$ | $n_d = 1.5103$ | $\nu = 63.4$ |
| | $R_2 = -46.56$ | | | |
| $L_2$ | | $t_2 = 1.48$ | $n_d = 1.6256$ | $\nu = 39.1$ |
| | $R_3 = +159.0$ | | | |
| | | $s_1 = 37.04$ | | |
| | $R_4 = +41.67$ | | | |
| $L_3$ | | $t_3 = 7.41$ | $n_d = 1.5109$ | $\nu = 60.6$ |
| | $R_5 = \infty$ | | | |
| | | $s_2 = 19.26$ | | |
| | $R_6 = -24.11$ | | | |
| $L_4$ | | $t_4 = 1.48$ | $n_d = 1.6411$ | $\nu = 58.0$ |
| | $R_7 = -146.27$ | | | |

$n_d$ being the index of refraction for the d-line of the spectrum
$v$ being the dispersal index
$L_1$—$L_4$ being the single lenses of the objective numbered from front to rear
R being the radii of curvature
$t$ being the thicknesses of the lenses
$s$ being the air spaces between the lenses, the sub-scripts of these refer to the surfaces, the thicknesses and the air spaces, numbered consecutively from the front and the + and − signs correspond to surfaces which are respectively convex and concave to the front.

3. A fully corrected 100 mm. focal length telephoto objective having substantially the following characteristics:

|  |  |  |  |  |
| --- | --- | --- | --- | --- |
| $L_1$ | $R_1=+35.18$ | $t_1=4.69$ | $n_d=1.5111$ | $v=63.4$ |
|  | $R_2=-48.96$ | | | |
| $L_2$ | | $t_2=1.56$ | $n_d=1.6261$ | $v=39.1$ |
|  | $R_3=+136.0$ | | | |
|  | | $s_1=37.74$ | | |
|  | $R_4=+35.55$ | | | |
| $L_3$ | | $t_3=2.96$ | $n_d=1.5400$ | $v=59.6$ |
|  | $R_5=+170.84$ | | | |
|  | | $s_2=22.14$ | | |
|  | $R_6=-22.22$ | | | |
| $L_4$ | | $t_4=1.48$ | $n_d=1.6200$ | $v=60.2$ |
|  | $R_7=-106.83$ | | | |

$n_d$ being the index of refraction for the d-line of the spectrum
$v$ being the dispersal index
$L_1$—$L_4$ being the single lenses of the objective numbered from front to rear
R being the radii of curvature
$t$ being the thicknesses of lenses
$s$ being the air spaces between the lenses, the sub-scripts of these refer to the surfaces, the thicknesses and the air spaces, numbered consecutively from the front and the + and − signs correspond to surfaces which are respectively convex and concave to the front.

References Cited in the file of this patent
UNITED STATES PATENTS

| | | |
| --- | --- | --- |
| 560,460 | Aldis | May 19, 1896 |
| 2,378,170 | Aklin | June 12, 1945 |
| 2,382,669 | Schade | Aug. 14, 1945 |
| 2,441,093 | Aklin | May 4, 1948 |
| 2,662,446 | Tronnier | Dec. 15, 1953 |